United States Patent [19]
Dunn et al.

[11] Patent Number: 5,703,680
[45] Date of Patent: Dec. 30, 1997

[54] METHOD FOR DYNAMIC INTERFERENCE PATTERN TESTING

[75] Inventors: William Frank Dunn, Stow; John Michael Maloney, Medina; Michael Lynn Hooper, Akron; Wayne David Maas, Copley, all of Ohio

[73] Assignee: The Goodyear Tire & Rubber Company, Akron, Ohio

[21] Appl. No.: 586,525

[22] Filed: Jan. 16, 1996

[51] Int. Cl.$^6$ .................................................. G01B 9/02
[52] U.S. Cl. ............................................ 356/35.5; 356/354
[58] Field of Search ........................... 356/35.5, 347, 356/348, 374, 354

[56] References Cited

U.S. PATENT DOCUMENTS 4,794,550  12/1988  Greivenkamp ..................... 356/374
5,257,088  10/1993  Tyson et al. ........................ 356/35.5

OTHER PUBLICATIONS

Direct Determination of Flexural Strain in Plates Using Projected Gratings. Liang et al. Sep. 1978. pp. 401–405.

Primary Examiner—Samuel A. Turner
Attorney, Agent, or Firm—David E. Wheeler

[57] ABSTRACT

When the pressure on a reinforced rubber object is varied, weaker portions of the object expand more than surrounding areas of the object. By (a) illuminating the object with single phase monochromatic light which is separated into more than one beam, (b) causing the object to distort by abrasion or expansion, (c) observing the interference patterns on the object as it distorts and (d) analyzing stress patterns revealed by the interference patterns, these physical changes can be detected, recorded and analyzed.

14 Claims, 1 Drawing Sheet

METHOD FOR DYNAMIC INTERFERENCE PATTERN TESTING

BACKGROUND OF THE INVENTION

The present invention relates to a method and apparatus for detecting anomalies in distortable objects.

Shearography, in general, is known in the art, and was developed by Y. Y. Yung, in 1972. In a shearography test method, a test surface is illuminated with coherent laser light and the reflected light is passed through a bi-refringent (having two optical axes) crystal. The light is split after passing through the bi-refringent crystal and reflected off the object, and the two light paths thus created are superimposed on each other creating phase sensitive information. Since the light is monochromatic, and the light paths are not of the same lengths, the light waves interfere with each other creating a null-point, or a dark area, wherever the wave lengths of two light waves are a half wave length out of phase. A slight change in dimension of the object being illuminated causes a slight change in the optical path of the reflected light, and when referenced against the earlier acquired reflected light produces light and dark interference patterns. Each ring in the interference pattern represents a one half wave length difference between that ring and the adjacent ring of opposite color (i.e. between light and dark).

In the prior art, this phenomenon was used to statically image the inside of aircraft tires to check on the integrity of the innerliner. When the innerliner is not consistently adhered to the carcass, those areas lacking adherence tend to bulge, and this bulge is detected by the formation of an interference pattern around the bulge.

Likewise, holography is sometimes used to detect distortions in objects. In holography, however, a beam splitter is used and light interference patterns are created on an object due to the difference in the path lengths of the split light beams.

Holography and shearography have in common that detection of anomalies can be based on interference patterns caused by light beam reconstruction on the object being studied.

SUMMARY OF THE INVENTION

A method of detecting anomalies in a distortable object comprises the steps of, (a) illuminating the object with single phase monochromatic light which is separated into more than one beam, (b) causing the object to distort by abrasion or expansion, (c) observing the interference patterns on the object as it distorts and (d) analyzing stress patterns revealed by the interference patterns. The operator may record the patterns as they develop using a CCD camera on video tape or record the patterns using a CCD (charge coupling device) camera and digitizing the signal. In the illustrated method, laser light, which may be polarized, is used to illuminate the object. The method may include the step of measuring the amount of distortion in the object by counting the number of fringes in the pattern, each fringe developed during distortion comprising ½ of the wave length of the monochromatic light used to illuminate the object.

In a specific use of the method, anomalies in a tire may be detected wherein the method comprises the steps of, (a) mounting a tire on a wheel or a split rim, (b) inflating the tire, (c) illuminating the tire with single phase monochromatic light, (d) applying a stress that causes distortion of the tire, and (e) observing the interference pattern on the tire as it is distorted.

Again, the dynamic interference pattern on the tire may be recorded as it develops, and the operator may analyze the dynamic stress patterns in the tire as illustrated by the interference patterns.

The stress may be applied to the tire by placing the tire in a chamber and evacuating the chamber. In alternative embodiments, the stress may be applied to the tire using a load wheel on a force variation machine, or a flat track, a step load test machine, or by using acoustic vibration.

DETAILED DESCRIPTION OF THE INVENTION

Although the present invention provides a nondestructive test method which can be used on a broad range of products, the invention is described specifically herein as it relates to locating and displaying areas of non-uniform stress on an inflated tire. The test method can be used dynamically to reveal sidewall bulge, valley and splice anomalies, missing cords, belt edges and the turnup edge in a tire, for example.

In the prior art, holography and shearography have been used statically to locate and display delamination or poorly bonded layers of structural components in finished tires.

The present method uses light reconstruction techniques to create interference patterns on the object being tested or measured. By "light reconstruction" it is meant that a monochromatic light beam is split using a beam splitter, as in holography, or a light beam is separated by a bi-refringent crystal, as in shearography, or by other means known to those skilled in the art, and the separated beams are directed to a specific object simultaneously, creating interference patterns around dimensional oddities in the object.

Although generally described herein for viewing the outside of an object, the method can also be used for viewing the inside of an object. When used for viewing the inside of a tire, for example, the laser and detecting equipment may be mounted on a split rim so that the equipment is on the inside of the tire when the split rim is engaged.

Using the test method of the invention, dynamic stress in a tire can be viewed in real time and can be saved on video tape or captured digitally using CCD cameras, etc, for analysis. For example, the method may use generally standard shearography apparatus to create a shearography image, and the shearography image is impinged on a CCD image detector. The image is saved in memory using a frame grabber for comparison at a later time.

The term "frame grabber" is used herein to describe the apparatus and process whereby an image is saved in memory as a series of digital values. Since the present invention involves a dynamic process, it is contemplated that each frame of a video tape, wherein changes in an object are observed, can be digitized and analyzed.

Figure 1:
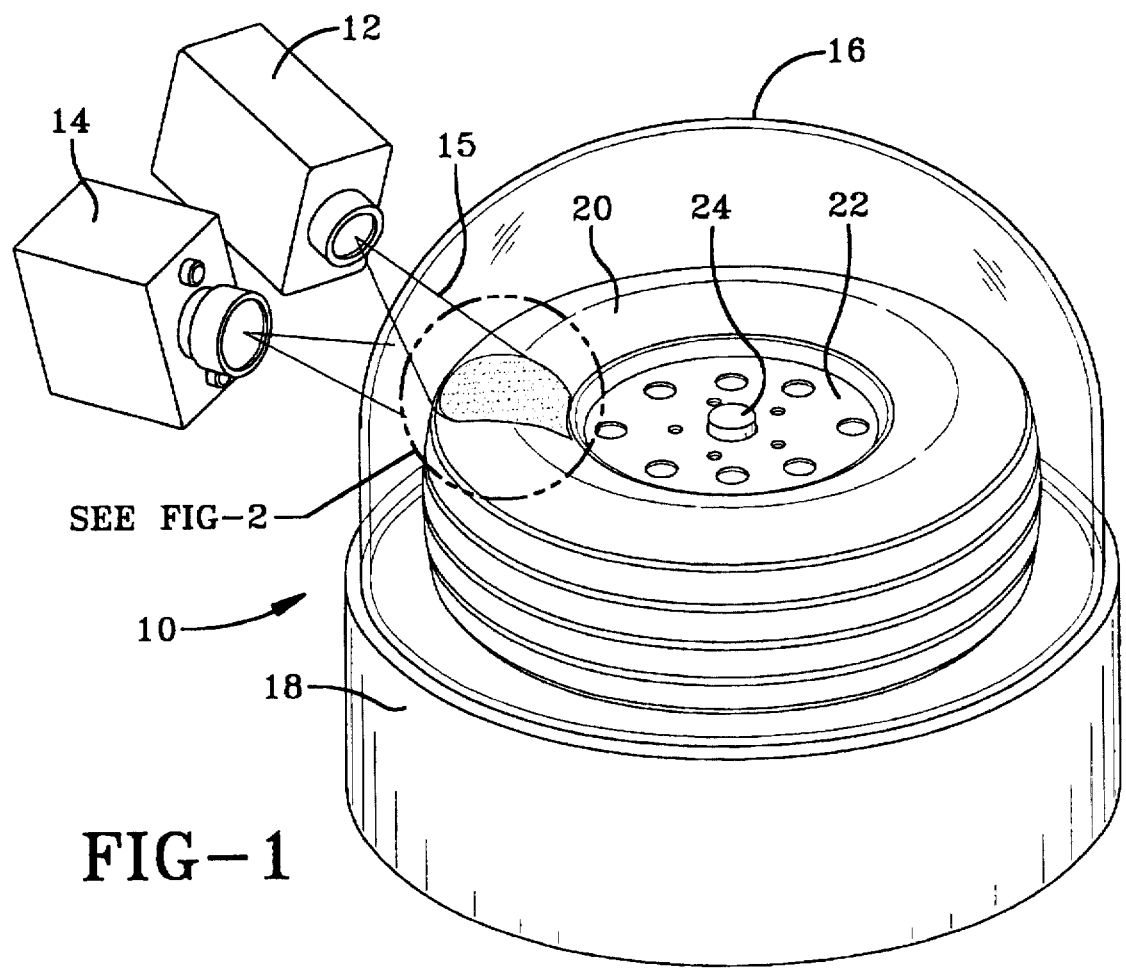
FIG. 1 illustrates one embodiment of apparatus which can be used to practice the method of the invention.

With reference now to FIG. 1, apparatus 10 comprises laser 12 for illuminating a tire 20 with mono-chromatic light 15. In the present invention, tire 20 is mounted on a wheel 22 and is inflated to a pressure of 10–275 psi, preferably 30–35 psi for example for a passenger-type tire. The higher pressures can be used in truck tires and aircraft tires; i.e., it is preferred that inflation of the tire be near normal inflation for that particular tire so normal cord stresses are observed.

The shearography image is obtained while the tire is in a stable position, and the wheel is turned on axle 24 to position the tire for a new image each time the image of a separate section of the tire is recorded and completed. Thus images, in turn, can be obtained around the full circumference of the tire. The images are collected by video camera 14.

In the illustrated embodiment, the tire and wheel are located under optically transparent dome 16 which is attached with an airtight seal to base 18, but those skilled in the art will recognize that the laser 12 and the camera 14 may be located inside the dome 16. To create the distortion in the object being tested, dome 16 is evacuated, and accordingly tire 20 expands as the pressure in the dome is reduced. If there are anomalies in the tire, i.e., if the cords are not uniform, or if one of the laminations of rubber is not uniformly adhered to the carcass, or if reinforcement cords are broken, areas of the tire associated with such anomalies will expand more rapidly than the rest of the tire causing phase shifts around the anomalies which correspond with the amount of distortion encountered. In general, since each ring in the interference pattern developed in shearography corresponds with one half wave length of light, the size of the anomaly, i.e., its height or depth, can be measured by counting the number of phase shifts demonstrated by the anomalies as it expands. In addition, the interference pattern can show the shape of the anomalies since, ordinarily, the interference pattern provides an outline of the distortion; and since the test is done dynamically, the pattern of growth of the anomaly may provide valuable information concerning the structure around the anomaly. Accordingly, the method is particularly valuable for detecting stress concentration in an object, in addition to some of the more conventional anomalies.

Those skilled in the art will recognize that the method can also be implemented by changing the inflation pressure in the tire (without a vacuum chamber) and observing the difference in distortion at different pressures.

If desired, the method can be fully automated and a computer programmed to detect when distortion is beyond pre-selected specifications, and provide an appropriate signal.

When using a vacuum chamber, the amount of vacuum needed is dependent on the object being tested. A steel object, for example a pressure tank, will require a greater vacuum than a tire to detect a significant difference in expansion in one area as compared to another. It is believed that the present invention can be used with reduced pressures of 0–14.5 psi.

The advantage of using the vacuum of the present invention for testing a pressure tank, as opposed to pressurizing the tank, is in the added safety inherent in the lower pressures used.

Although it is illustrated that distortion of the object being tested is obtained by subjecting the object to pressure changes, those skilled in the art will recognize that other forms of stress can be applied to the object. For example, a tire can be acoustically vibrated, and areas of non-uniformity will vibrate differently than the rest of the tire. In other possible methods, a shearography unit could be used in conjunction with a force variation machine. The tire may be stressed on the load wheel of the force variation machine, and in such an example, the tire would be turned while under load and be examined for non-uniformity while it rolls.

Figure 2:
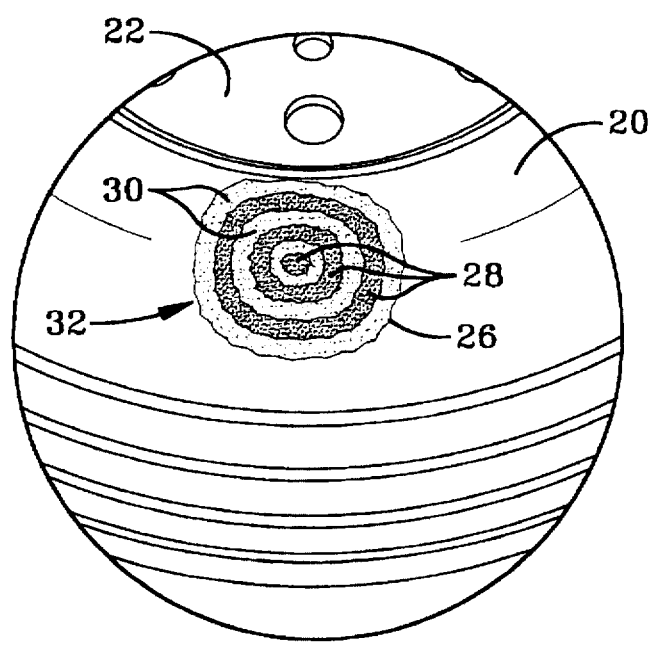
FIG. 2 illustrates a shearography pattern from an object being tested.

With reference now to FIG. 2, a shearography pattern 26 illustrated on a tire 20 demonstrates light 30 and dark 28 fringes which are typical of shearography. In the illustrated embodiment, anomaly 32 represents a portion of a tire which has bulged when the tire was subjected to a reduced pressure of 14–14.5 psi. Each fringe represents a change in dimension of ½ wave length, and since 558 nm wave length light is used in the illustrated embodiment, each fringe represent 279 nm difference in height. If the anomaly is a sharp, high bulge, the fringes will be narrow, and there will be numerous fringes around the center of the bulge. If the bulge is gradual and shallow, the fringes will be wide, and the number of fringes will be reduced.

Although green laser light was used in the illustrated embodiment, those skilled in the art will recognize that any available monochromatic laser light can be used in the method, including red light, blue light and light in the infrared portion of the spectrum. The choice of light used can be made based on the object being inspected or the detecting equipment used. Infrared light, for example, is preferred when CCD (charge coupling device) equipment is used and the data is digitized.

The location and the size of a particular bulge are factors considered in the analysis. A large bulge in the shoulder region of the sidewall, for example, may indicate the separation of ply cords in the region. A smaller bulge may indicate that the ply cords are spread too widely. Other fringe patterns and their meaning will be apparent to those skilled in the art with continued use of the method.

While the invention has been specifically illustrated and described, those skilled in the art will recognize that the invention can be variously modified and practiced. The invention is limited only by the scope of the following claims.

What is claimed is:

1. A method of detecting anomalies in a distortable object comprising the steps of:
    (a) illuminating said object with single phase monochromatic light which is separated into at least two different beams
    (b) causing said object to distort by percussion, abrasion or expansion
    (c) observing the interference patterns created by reconstruction of the light beams on the object dynamically as the object distorts and
    (d) analyzing stress patterns revealed by the interference patterns.

2. The method of claim 1 which comprises the step of recording the interference patterns as they develop on video tape, or digitally using a CCD (charge coupling device) camera and a frame grabber.

3. The method of claim 1 which comprises the step of using light of 558 nm length to illuminate said object.

4. The method of claim 1 which comprises the step of measuring the amount of distortion in said object by counting the number of fringes in the interference patterns, each fringe developed during distortion representing ½ of the wave length of the mono-chromatic light used to illuminate the object.

5. The method of claim 1 which further comprises analyzing the growth pattern of an anomaly.

6. A method of detecting anomalies in a tire comprising the steps of:
    (a) mounting a tire on a wheel or split rim
    (b) inflating said tire
    (c) illuminating said tire with single phase monochromatic light
    (d) applying a stress that causes distortion of said tire (e) observing the change in light interference patterns developed on the tire dynamically as the tire is distorted.

7. The method of claim 6 which comprises the step of recording the interference pattern as it develops.

8. The method of claim 6 which comprises the step of analyzing the stress patterns in the tire as illustrated by the interference patterns.

9. The method of claim 6 wherein the step of applying stress to the tire comprises the further steps of placing the tire in a chamber and evacuating the chamber.

10. The method of claim 6 wherein stress is applied to the tire using a load wheel on a force variation machine, a flat track, or a step load machine.

11. The method of claim 6 wherein stress is applied to the tire using acoustic vibration.

12. The method of claim 6 which comprises the step of using light of 558 nm wave length to illuminate said tire.

13. The method of claim 6 which comprises the step of measuring the amount of distortion in said tire by counting the number of fringes in the interference patterns, each fringe developed during distortion representing ½ of the wave length of the mono-chromatic light used to illuminate the object.

14. The method of claim 13 which comprises the further step of analyzing the dynamic growth pattern of an anomaly.

* * * * *